United States Patent
Bebko

(10) Patent No.: US 7,218,631 B1
(45) Date of Patent: May 15, 2007

(54) SWITCHING APPARATUS WITH ISDN ACCESS

(75) Inventor: Thomas Bebko, Kamen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/958,060

(22) PCT Filed: Mar. 28, 2000

(86) PCT No.: PCT/DE00/00947

§ 371 (c)(1),
(2), (4) Date: Oct. 1, 2001

(87) PCT Pub. No.: WO00/60883

PCT Pub. Date: Oct. 12, 2000

(30) Foreign Application Priority Data

Mar. 30, 1999 (DE) .................. 199 14 511

(51) Int. Cl.
*H04L 12/66* (2006.01)
*H04J 3/16* (2006.01)

(52) U.S. Cl. .................... 370/356; 370/466

(58) Field of Classification Search ........ 370/352–356, 370/362, 466, 489, 264; 379/269; 455/420
See application file for complete search history.

(56) References Cited

U.S. PATENT DOCUMENTS

| | | | |
|---|---|---|---|
| 5,649,005 A | | 7/1997 | Lynch et al. |
| 5,875,234 A | | 2/1999 | Clayton et al. |
| 5,974,136 A | * | 10/1999 | Murai ...................... 379/269 |
| 6,308,062 B1 | * | 10/2001 | Chien et al. ............... 455/420 |
| 6,563,799 B1 | * | 5/2003 | Haislett et al. ............ 370/264 |
| 6,643,291 B1 | * | 11/2003 | Yoshihara et al. ....... 370/395.5 |
| 6,735,208 B1 | * | 5/2004 | Riemann et al. ........... 370/401 |

FOREIGN PATENT DOCUMENTS

| | | |
|---|---|---|
| DE | 3924974 | 7/1989 |
| DE | 19636819 | 9/1996 |

* cited by examiner

*Primary Examiner*—Chi Pham
*Assistant Examiner*—Melanie Jagannathan
(74) *Attorney, Agent, or Firm*—Bell, Boyd & Lloyd LLP

(57) ABSTRACT

Switching apparatus with ISDN access that provides an ISDN interface unit which has the advantage of being realized in a separate housing with which already existing apparatuses realized on a module can be used, the switching apparatus being constructed via coupling with an ISDN module which handles the communication between ISDN and USB, wherein the apparatus can be connected to the personal computer while the latter is in operation, and constitutes a unit that can be sold and maintained separately.

8 Claims, 2 Drawing Sheets

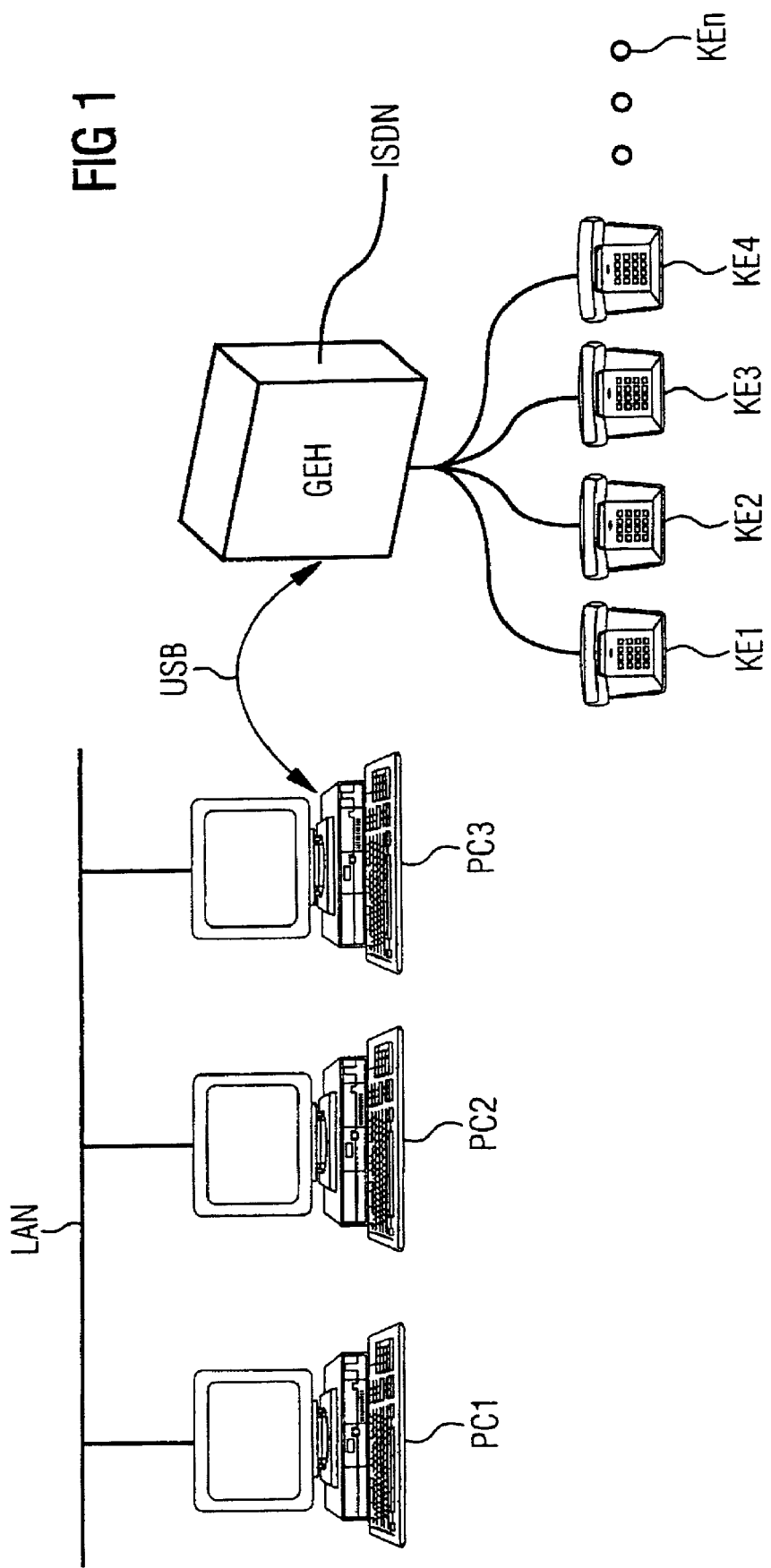

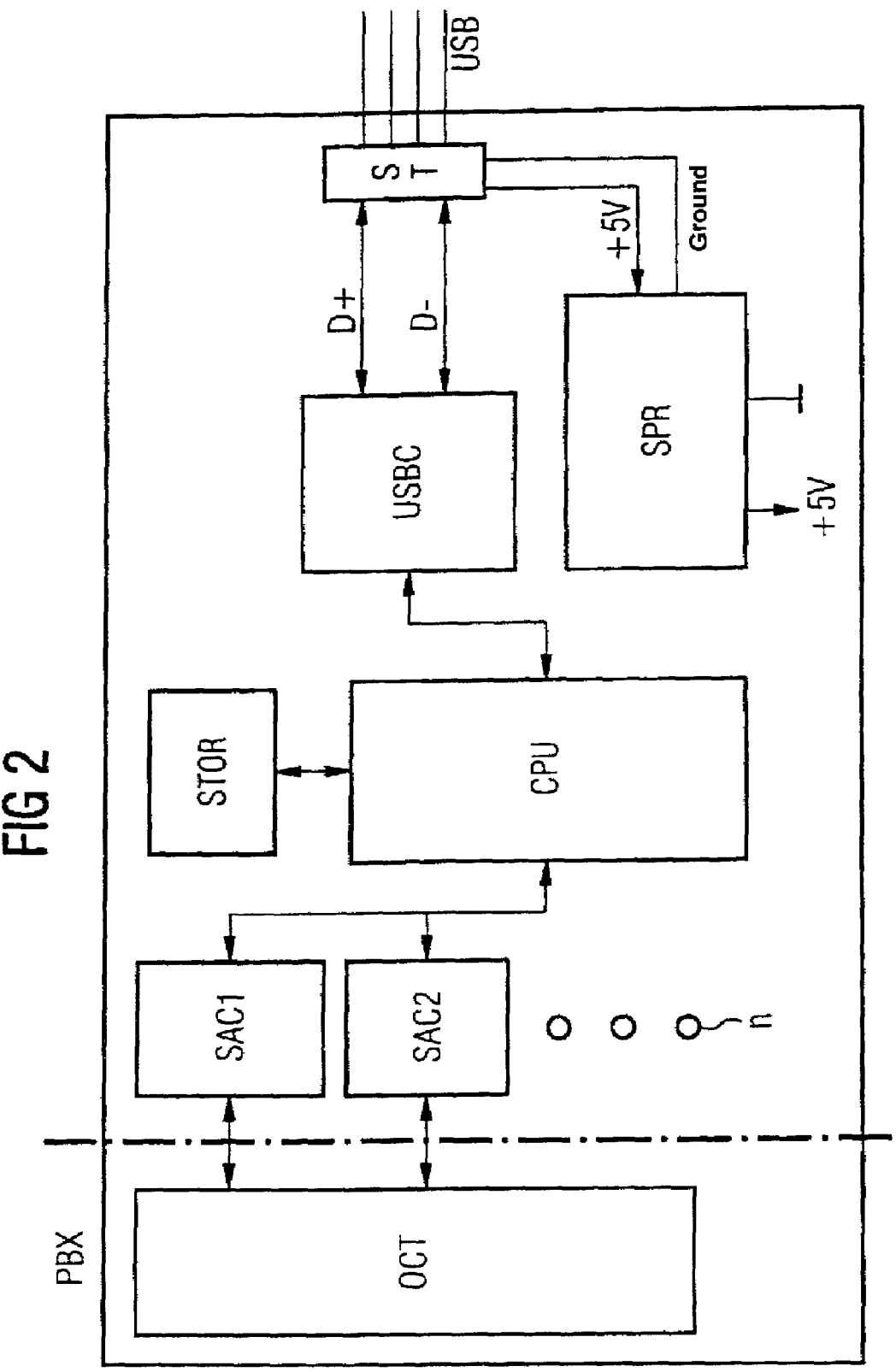

SWITCHING APPARATUS WITH ISDN ACCESS

BACKGROUND OF THE INVENTION

As the number of digital communication services offered by communication service provides increases, so too does the importance of switching apparatuses that support both analog and digital terminals. The increasing use of the medium of the World Wide Web and coupled with increase in the importance of this medium creates a growing need for communication users of even comparatively small and medium-sized switching apparatuses to have access to the World Wide Web. The existing need among communication users to connect personal computers (PCs) to telephone systems is currently met, for example, by Siemens AG with a private branch exchange (PBX) realized in the form of a plug-in card for a personal computer. Via this telephone system it is possible to drive digital terminals, to make telephone calls with PC support, and to perform the administration and billing management of the telephone system on the PC. These capabilities are described, for example, on the World Wide Web at the address: "http://www.siemens.de/ic/networks/pn_neu/km/hicomint/paar2. htm"

One disadvantage of existing systems is the necessity of opening the housing of the personal computer in order to install the plug-in card. Another advantage is that software administration measures are required to ensure reliable operation of the private branch exchange (i.e., the need to continually update the administration and interface software to ensure compatability with new versions of PC operating systems.

An object of the present invention is, therefore, to provide an external switching apparatus with Integrated Services Digital Network (ISDN) access from PC environments.

SUMMARY OF THE INVENTION

In a switching apparatus according to the present invention, it is advantageous if all methods of interconnecting the various bus systems such as the Universal Serial Bus (USB), the private branch exchange and the ISDN, are present. By virtue of the external connection via the USB, no conflicts arise with the internal PC hardware. Moreover, fewer electromagnetic compatibility problems arise as a result of moving the private branch exchange to outside the PC. Furthermore, it is possible to set up the switching apparatus with ISDN access via a USB interface while the personal computer is in operation.

The conversion between USB communication data and ISDN communication data is advantageously performed using a general-purpose processor. In this way, it is possible to minimize the hardware development work required and specific conversion requirements can be realized via software. Moreover, it is advantageously possible to employ standard controllers for access to the USB.

In one advantageous embodiment, it is possible to employ a second function unit for converting ISDN communication data into PBX communication data on a standard module which is set up to drive digital terminals on the private branch exchange side. This avoids costly development measures to provide for the driving of the ISDN.

Preferably, a third function unit is used to drive the second function unit in the switching apparatus, which third function unit usually serves for the driving of digital terminals. In this way, a functioning configuration for providing a private branch exchange with ISDN access and simultaneous interface to personal computers is realized with minimal outlay for hardware development.

In one embodiment of the switching apparatus described, the first and the second function units are advantageously arranged on a separate module. In this way, the ISDN functionality and the interface functionality to the USB can be realized and established separately, while an already existing private branch exchange realized on a module can continue to be used.

In a further embodiment of the switching apparatus described, an already existing private branch exchange and a further module with ISDN and USB interface functionality can be combined. This produces a compact device which can be sold and maintained separately.

It is especially advantageous for an already existing private branch exchange realized on a module to be connected directly via a plug connection to a second module which can be connected to a USB and which has ISDN functionality, as well as the ability to exchange PBX communication data with the private branch exchange.

In yet another embodiment of the present invention, it is advantageous for the switching apparatus to be used in a (Local Area Network (LAN). This enables all personal computers connected to the LAN to access the ISDN, or the communication devices connected to the private branch exchange and vice versa.

Additional features and advantages of the present invention are described in, and will be apparent from, the following detailed Description of the Invention and the Figures.

BRIEF DESCRIPTION OF THE FIGURES

FIG. 1 shows an exemplary embodiment of a switching apparatus in a local area network in accordance with the principles of the present invention.

FIG. 2 shows a schematic illustration of a switching apparatus in accordance with the principles of the present invention.

DETAILED DESCRIPTION OF THE INVENTION

FIG. 1 shows an exemplary embodiment of a switching apparatus within a LAN, the LAN including personal computers PC1, PC2 and PC3. PC3 has an interface to a Universal Serial Bus (USB), to which it is possible to externally connect peripheral units that are to communicate with the PC. Connected to the USB is a private branch exchange with ISDN functionality in a housing GEH. The private branch exchange in the housing GEH in turn serves communication terminals KE1, KE42 to Ken. Function units are preferably arranged on two modules in the housing GEH, with the private branch exchange being realized on a plug-in card for conventional PCs, whereby an IDE interface or a PCI interface can be provided as appropriate. Function units for converting the PBX communication data (i.e. the data that is output from the private branch exchange), into either ISDN communication data or USB communication data can be provided on a further module. The module is preferably realized in such a way that it can be connected to the private branch exchange on the other plug-in card via a plug connection, and that it has a plug connection to the USB. Using the plug connection, the switching apparatus located in the housing GEH can be connected to the USB of the PC. FIG. 1 illustrates a connection between the function elements in the housing GEH and the PC PC3 of the LAN. The connection is denoted by USB. In addition, an ISDN access line ISDN is led out of the housing GEH.

FIG. 2 shows various function elements of an exemplary embodiment of a switching apparatus according to the principles of the present invention. To the left of the dot-dashed line is a function element of the private branch exchange OCT, with the private branch exchange (not illustrated fully) being denoted by PBX. The function unit OCT has the task of preparing the PBX communication data to be exchanged with the private branch exchange for the following components, and conversely from the following components SAC. Illustrated here are components SAC1, SAC2 to SACn. The function units SAC are subscriber access controllers which handle the conversion of the PBX communication data into ISDN communication data. Owing to the bandwidth of up to a maximum of 12 Mbit/sec provided by USB, up to 8 such subscriber access controllers SAC can be served by one module OCT of the private branch exchange. Two times 64 kbit/sec are therefore possible per subscriber access controller SAC, i.e., two ISDN B-channels can be made available. As a result of this arrangement, 16 64 kbit/sec B-channels can be made available, thus catering to future communication bandwidth requirements. The conversion of ISDN communication data into USB communication data is performed by a processor CPU, which uses a program in a memory STOR for this purpose. Access to the USB is controlled by a control module USBC which is connected via data lines D+ and D− and via a plug connection to the USB. A voltage controller SPR provides defined potentials in the schematic circuit arrangement illustrated.

The private branch exchange PBX is preferably realized in the form of a module, and is connected via a plug connection via a cable or directly to a module preferably having the function features of the function elements shown to the right of the dot-dashed line. In this way it is possible to use switching modules already available for installation in personal computers with IDE or ISA buses. A switching apparatus with ISDN access is thus provided in a separate housing, which can be connected via the USB to a PC, to a LAN via the PC, or other devices having a USB interface. The functionalities of file transfer, fax, computer-telephone integration and World Wide Web are thus available to all communication terminals in the communication network with the switching apparatus. Communication is possible in any direction over all three communication media, LAN, USB and ISDN, as well as in the area of the private branch exchange via the telephone lines to the communication terminals.

Although the present invention has been described with reference to specific embodiments, those with skill in the art will recognize that changes may be made thereto without departing from the spirit and scope of the invention as set forth in the hereafter appended claims.

The invention claimed is:

1. A switching apparatus with ISDN access, the switching apparatus connected to at least one first computer device having an interface for a Universal Serial Bus, the switching apparatus comprising:
    at least one first function unit for converting ISDN communication data into Universal Serial Bus communication data;
    a PBX switching apparatus;
    at least one second function unit for converting ISDN communication data into communication data for the PBX switching apparatus; and
    a first housing unit, wherein the first and second function units, as well as the PBX switching apparatus, are arranged and interconnected within the first housing unit in such a way that each of ISDN, PBX, USB communication data can be converted into respective other communication data and vice versa.

2. A switching apparatus as claimed in claim 1, wherein the first function unit is a general-processor which converts the communication data via a program.

3. A switching apparatus as claimed in claim 1, wherein the second function unit is a subscriber controller which can be used in an ISDN terminal.

4. A switching apparatus as claimed in claim 1, wherein the PBX switching apparatus has a third function unit which can drive an ISDN terminal, the third function unit being connected to the second function unit, thereby enabling the exchange of communication data.

5. A switching apparatus as claimed in claim 1, wherein at least the first and second function units are arranged on a first module within the first housing unit.

6. A switching apparatus as claimed in claim 5, wherein at least the third function unit is arranged on a second module within the first housing unit.

7. A switching apparatus as claimed in claim 6, wherein the first and second module are connected to one another via a plug connection.

8. A switching apparatus as claimed in claim 1, wherein the first computer device is integrated in a local area network, the switching apparatus capable of converting local area network communication data into Universal Serial Bus communication data.

* * * * *